United States Patent [19]

Murphy

[11] 4,050,657
[45] Sept. 27, 1977

[54] AIRCRAFT PARACHUTE SAFETY SYSTEM

[76] Inventor: Philip Murphy, 902 Elm St., Alexandria, Minn. 56308

[21] Appl. No.: 721,426

[22] Filed: Sept. 8, 1976

[51] Int. Cl.² .................... B64D 17/70; B64D 17/80
[52] U.S. Cl. .................................. 244/139; 244/147
[58] Field of Search ............... 244/139, 138 R, 140, 244/146, 147

[56] References Cited

U.S. PATENT DOCUMENTS

| 1,296,736 | 3/1919 | Austin | 244/147 |
| 1,465,835 | 8/1923 | Atkinson | 244/139 |
| 1,916,340 | 7/1933 | Softis | 244/139 |
| 2,018,448 | 10/1935 | Juergens | 244/139 |
| 3,315,920 | 4/1967 | Caughron | 244/139 |
| 3,352,519 | 11/1967 | Hibi | 244/139 |

Primary Examiner—Galen L. Barefoot
Attorney, Agent, or Firm—Merchant, Gould, Smith, Edell, Welter & Schmidt

[57] ABSTRACT

An airplane parachute device includes parachutes and release mechanism mounted in the upper surface of the aircraft's fuselage. A releasable hatch, covers each parachute and release mechanism, and is in operable communication with the pilot's compartment to allow for remote controlled release. The parachutes are under similar remote control and are ejected from the parachute compartments by a coiled spring system. Each parachute is aided in opening by an inflatable collar affixed to the outer rim. A shock absorbing piston is mounted to the bottom of the parachute compartment and to the tether lines of the parachute.

2 Claims, 4 Drawing Figures

U.S. Patent  Sept. 27, 1977  4,050,657
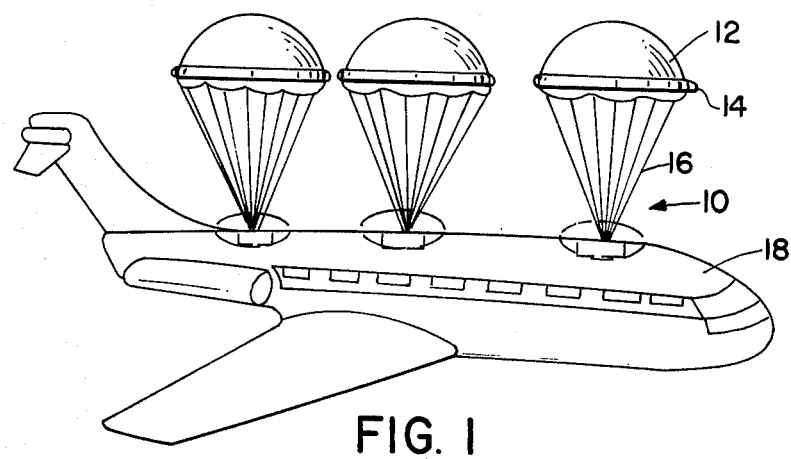
FIG. 1
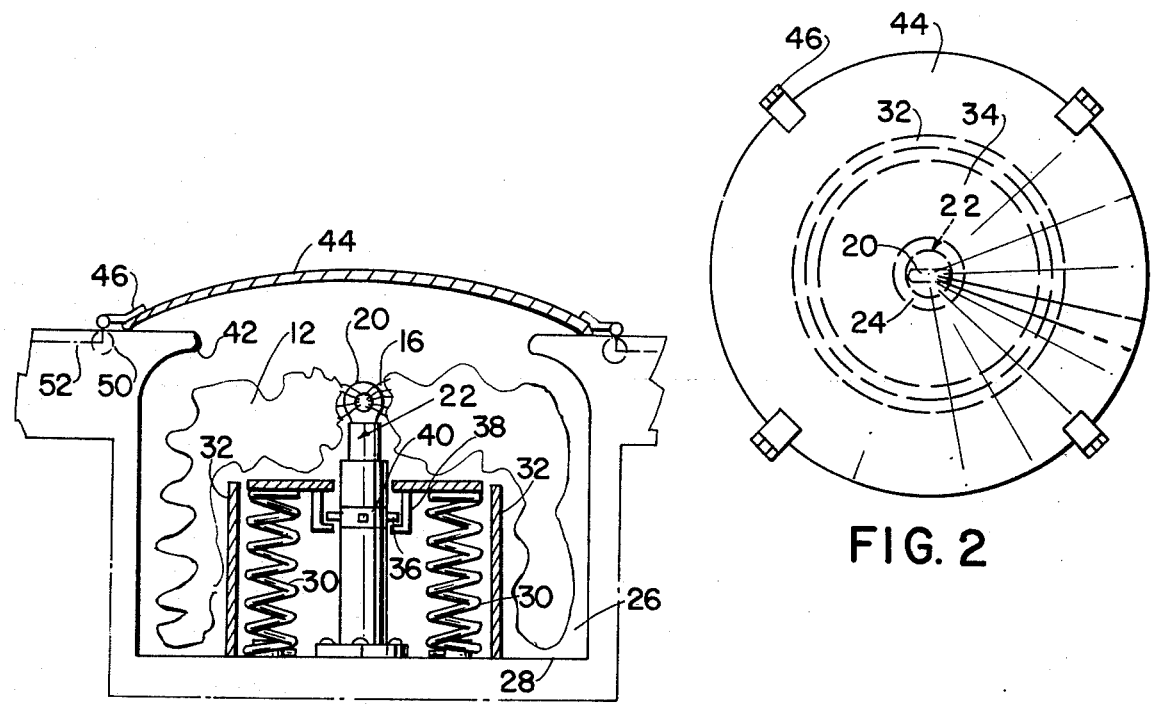
FIG. 2
FIG. 3
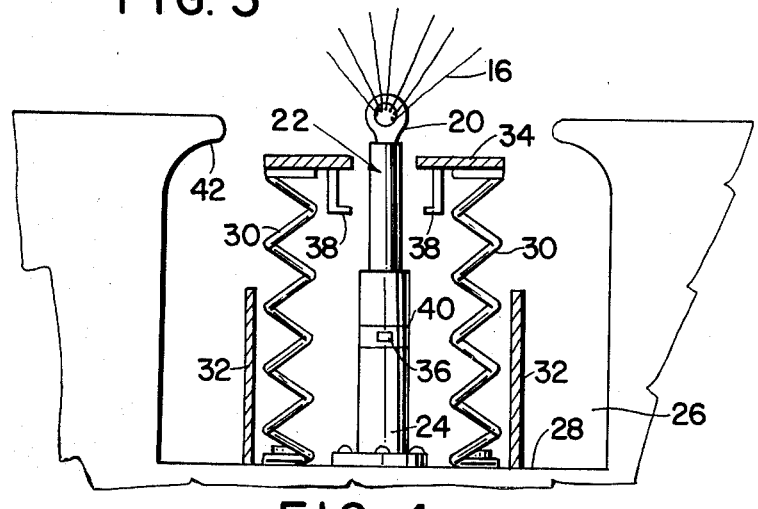
FIG. 4

AIRCRAFT PARACHUTE SAFETY SYSTEM

BACKGROUND OF THE INVENTION

The prior art discloses several different types of aircraft parachute mechanisms, some of which are referred to as safety devices. Typical safety devices are disclosed in U.S. Pat. Nos. 3,833,192 Vitack; 3,051,420 Novak; 3,129,909 Smith; 3,315,920 Coughron; 3,129,913 Smith. Although these systems of the prior art employ parachutes, they do not address themselves to the problems associated with deploying and inflating parachutes at high velocities, namely entanglement during deployment and the extreme stresses encountered upon inflation.

It is therefore, an object of the present invention to overcome deployment problems and shock related thereto.

It is a further object of the present invention to provide an inflatable collar around the outer rim of each parachute.

It is a further object of the present invention to provide a piston type shock absorber to decrease the magnitude of stresses encountered upon inflation of the parachute.

These and other objects have been achieved according to the present invention and will become more apparent by reference to the disclosure and claims that follow, as well as the appended drawing.

SUMMARY OF THE INVENTION

The present invention relates to parachute mechanism, and in particular to parachute mechanisms associated with all types of aircraft.

The parachute mechanism of the present invention comprises a plurality of parachutes, having a self-inflating collar affixed around each parachute's outer rim, a piston type shock absorber acting as the linkage between each parachute and the airplane, and a spring mounted ejector plate for each parachute. Each parachute mechanism is located in an enclosed compartment, in the upper surface of the aircraft's fuselage each said compartment is sealed by a remote controlled, releasable cover hatch.

BRIEF DESCRIPTION OF THE SEVERAL VIEWS OF THE DRAWING

FIG. 1 illustrates a perspective view of an aircraft with three parachute mechanisms after activation, with the parachutes fully deployed;

FIG. 2 illustrates a top view of a parachute compartment with the remote controlled cover hatch in position;

FIG. 3 illustrates a cut-away side view of a parachute compartment, in position ready to be activated; and FIG. 4 illustrates a cut-away side view of a parachute compartment, with the cover hatch released and the parachute fully deployed.

DESCRIPTION OF THE PREFERRED EMBODIMENT

Referring to the drawing and particularly FIGS. 1 through 4, an aircraft parachute mechanism 10 is illustrated having a hemispherical sheet element 12, a self inflating collar 14 and shrouds 16, supporting aircraft 18 in a gradual descent from the sky.

Referring now specifically, to FIGS. 1 and 4, shrouds 16 are affixed to one end 20 of a piston type shock absorber 22, the other end 24 of the shock absorber 22 is affixed to the parachute compartment 26 base plate 28. Extended coil springs 30 are shown, within the ejector housing 32, attached to ejector plate 34. Release latch 36 is disengaged from flange 38 by rotation of release collar 40, the rotation of release collar 40 is accomplished through conventional remote controlled gearing (not shown). To aid the parachute sheet 12 and shrouds 16 in their exit from the parachute compartment 26 rounded sidewalls 42 are provided.

Referring now particularly to FIGS. 2 and 3, parachute sheet 12 and shrouds 16 are packed within parachute compartment 26. Ejector plate 34 is held in position by the alignment of latches 36 mounted on collar 40 and release flanges 38. Coil springs 30 are shown compressed within housing 32. Parachute compartment 26 is sealed by hatch cover 44, which is held in position by a plurality of pivotally mounted latches 46.

In operation, the pivotally mounted latches 46 are released upon activation from the pilot's compartment by means of a conventional solenoid type activator (not shown). Indicators 50 are electrically connected by wires 52 to the pilot compartment to display the release of hatch cover 44 on an indicator panel (not shown).

While I have shown and described what I believe to be the preferred embodiment of my present invention, it will be understood by those skilled in the art that various modifications and rearrangements may be made therein without parting from the spirit and scope of the invention.

What I claim is:

1. An aircraft parachute mechanism comprising:
   a. means defining a compartment within an upper surface of the fuselage of said aircraft for housing said parachute mechanism, said means including a base plate element and curved side walls;
   b. a cover hatch element removably affixed to said fuselage above said compartment;
   c. ejector means comprising, a horizontally disposed ejector plate member of generally flat configuration disposed in said compartment, having a centrally located hole extending therethrough and flange elements extending downwardly from said ejector plate member, and a plurality of coiled spring elements affixed at one end to said base plate element and at their other end to said ejector plate member;
   d. a piston type shock absorber element having one end affixed to said base plate element and its other end extending upwardly through said centrally located hole in the ejector plate member;
   e. a parachute stored within said compartment in communication with said ejector means;
   f. a plurality of shroud lines affixed at one end to said parachute and at their other end to said other end of said shock absorber element;
   g. a remote controlled rotatable sheath encircling said piston type shock absorber; and
   h. a plurality of flange elements disposed on said sheath, said flange elements being adapted to releasably engage said downwardly extending flange elements affixed to said ejector plate member for releasable retention of said ejector plate member.

2. An aircraft parachute mechanism comprising:
   a. wall means defining a compartment within an upper surface of the fuselage of said aircraft for housing said parachute mechanism, said wall means including a generally cylindrical wall and a base plate element;

b. cover means removably affixed to said fuselage above said compartment;
c. ejector means in said compartment including a horizontally disposed ejector plate member and means yieldingly urging said ejector plate member in an upward ejecting direction, said ejector plate member having a central opening therethrough;
d. a shock absorber having one end affixed to said base plate element and another end extending through said central opening;
e. a parachute stored in said compartment;
f. a plurality of shroud lines connected at one end to said parachute and at the other end to said shock absorber;
g. a remote controlled rotatable sheath on said shock absorber;
h. and cooperating flanges on said sheath and said ejector plate member for releasably holding said ejector plate member against parachute ejecting movements.

* * * * *